INVENTORS
M. K. TESTERMAN
P. C. McLEOD, Jr.
BY Young & Quigg
ATTORNEYS

Sept. 20, 1966    M. K. TESTERMAN ET AL    3,273,377
FLUID OSCILLATOR ANALYZER AND METHOD Filed Aug. 12, 1963    2 Sheets-Sheet 2

INVENTORS
M. K. TESTERMAN
P. C. McLEOD, JR.
BY
Young & Quigg
ATTORNEYS

United States Patent Office 3,273,377
Patented Sept. 20, 1966

3,273,377
FLUID OSCILLATOR ANALYZER AND METHOD
Maurice K. Testerman and Paul C. McLeod, Jr., Little Rock, Ark., assignors to Phillips Petroleum Company, a corporation of Delaware
Filed Aug. 12, 1963, Ser. No. 301,418
5 Claims. (Cl. 73—23.1)

This invention relates to fluid oscillators. In another aspect it relates to the analysis of fluid streams to determine changes in composition thereof. In still another aspect it relates to detectors for use in chromatographic analyzers.

In various industrial and laboratory procedures there is a need to detect changes in composition of fluid mixtures. One such need occurs in making analyses by chromatography. In a conventional chromatographic analyzer, a fluid sample to be analyzed is injected into a column which contains a packing material that selectively retards passage of the individual constituents of the fluid sample. A carrier gas is directed through the column to elute the constituents of the fluid sample in sequence. The presence of the individual sample constituents in the column effluent normally is detected by comparing the thermal conductivity of the column effluent with the thermal conductivity of a reference gas, such as the carrier gas. While these thermal conductivity detectors are satisfactory for many analyses, detectors having greater sensitivity are desirable for some applications.

In accordance with this invention, a novel gas analyzer is provided which is in the form of a fluid oscillator. A fluid stream to be detected is directed through an orifice and then divided into two streams which flow through respective outlet passages. A portion of each of the resulting outlet streams is removed and returned to the main stream at the outlet of the orifice. These returned streams impinge upon the orifice effluent in opposition to one another and tend to divert the main stream into opposite outlet passages. In this manner, the stream directed through the orifice tends to oscillate back and forth at a frequency which is a function of the molecular weight of the fluid stream. If the molecular weight of this stream should increase, there is greater inertia which tends to prevent the stream from shifting as rapidly as before. The resulting oscillations can be detected by positioning a pressure sensitive device in either of the outlet streams. When the apparatus of this invention is employed in a chromatographic analyzer, one detector receives the column effluent and a second detector receives a sample of reference gas. The frequencies of oscillation of the two detectors can be compared so that any difference is indicative of sample fluid in the column effluent.

Accordingly, it is an object of this invention to provide a novel fluid oscillator.

Another object is to provide a method of and apparatus for detecting changes in composition of fluid streams.

A further object is to provide an improved detection system for use in chromatographic analyzers.

Other objects, advantages and features of the invention should become apparent from the following detailed description, taken in conjunction with the accompanying drawing in which.

Figure 1:
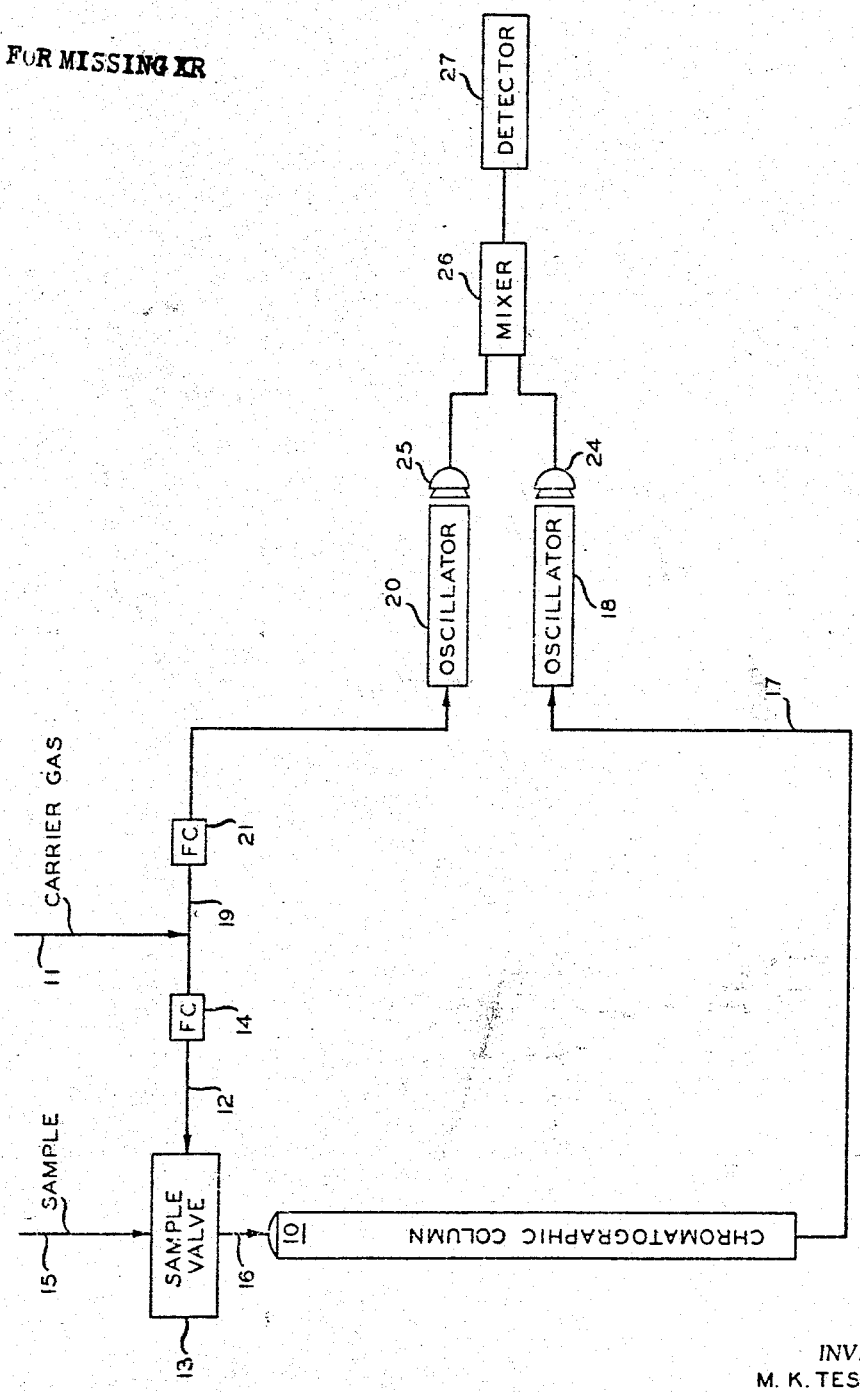
FIGURE 1 is a schematic representation of a chromatographic analyzer having the detection system of this invention incorporated therein.

Referring now to the drawing in detail and to FIGURE 1 in particular, there is shown a chromatographic column 10 which is filled with a conventional packing material which selectively retards passage of the constituents of a fluid sample mixture. A carrier gas is introduced into the system through an inlet conduit 11 which branches into conduits 12 and 19. Conduit 12 communicates with a conventional sample valve 13. A flow controller 14 is associated with conduit 12 to maintain the rate of flow therethrough at a preselected constant rate. A sample mixture to be analyzed is introduced into valve 13 by means of a conduit 15. Valve 13 can be of the type which periodically injects a preselected amount of this sample into the carrier gas. The effluent from valve 13 is directed to the inlet of column 10 by means of a conduit 16. The column effluent is directed by means of a conduit 17 to the inlet of a first fluid oscillator 18. Conduit 19, which has a flow controller therein, communicates with the inlet of a second fluid oscillator 20.

As will be described hereinafter in detail, oscillators 18 and 20 establish vibrations at frequencies which are functions of the composition of the gas streams introduced therein. The vibrations established by oscillators 18 and 20 are received by conventional microphone detectors 24 and 25. The output signals of the two microphones are applied to a mixer circuit 26 which establishes an output signal that is representative of the difference between the frequencies of the vibrations established by the two oscillators. The output of mixer 26 is applied to a detector 27 which is capable of measuring the resulting beat frequency. The mixer can include a low-pass filter to block the relatively high frequency signals of the oscillators and pass only the relatively low beat frequency.

Prior to the introduction of a fluid sample into the system, carrier gas flows through column 10 to oscillator 18 and directly to oscillator 20. Flow controllers 14 and 21 are adjusted so that oscillators 18 and 20 establish output signals of the same frequency. A fluid sample to be analyzed is injected into the system by operation of valve 13. The effluent from column 10 thereafter includes in sequence the individual constituents of the sample mixture. When these constituents enter oscillator 18, the frequency of the vibrations of the oscillator is changed so that an output beat frequency signal appears at detector 27.

Figure 2:
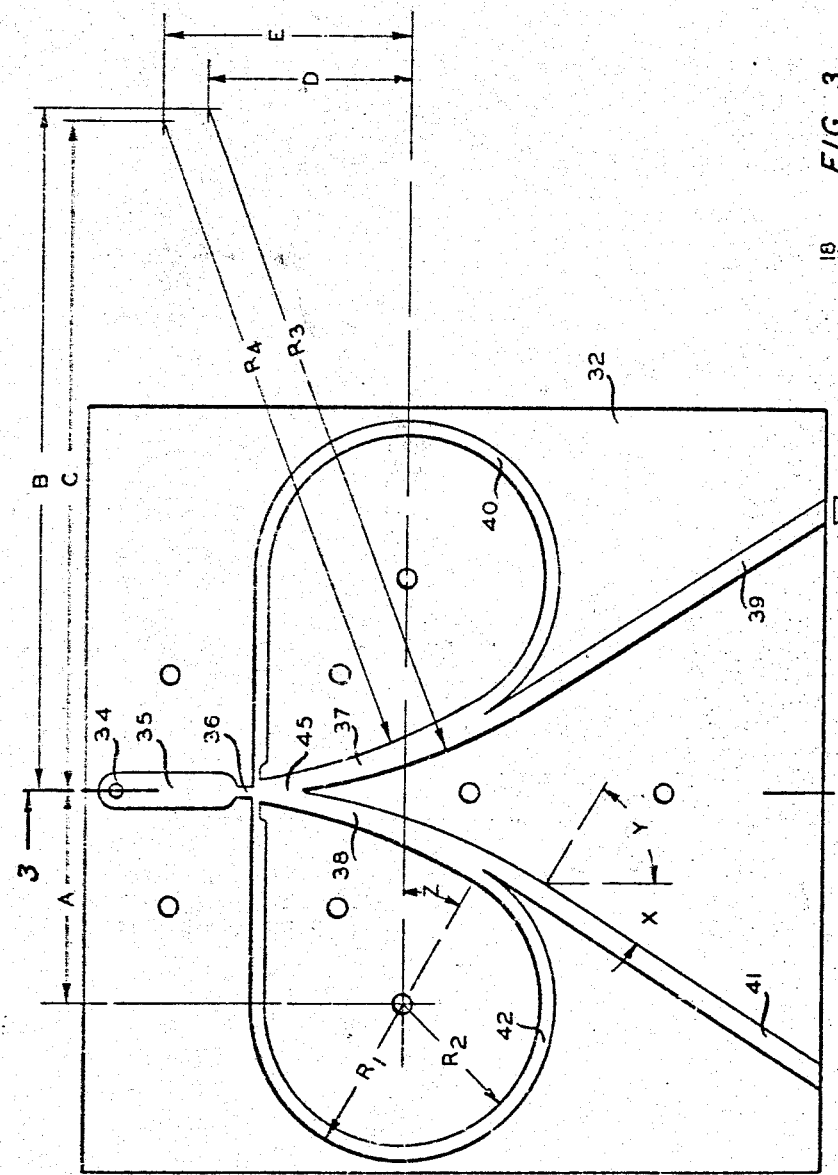
FIGURE 2 illustrates the configuration of an embodiment of the fluid oscillator of this invention.
Figure 3:
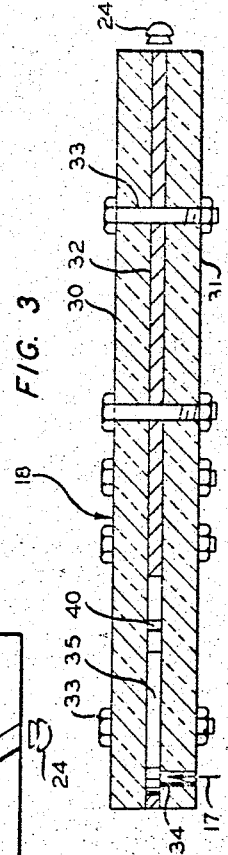
FIGURE 3 is a cross-sectional view, taken along line 3—3 of FIGURE 2, of the assembled fluid oscillator of this invention.

An embodiment of the fluid oscillator of this invention is illustrated schematically in FIGURES 2 and 3. As shown in FIGURE 3, two solid plates 30 and 31 are separated by a relatively thin plate 32. The three plates are secured together by suitable bolts 33. The fluid sample to be analyzed is introduced through a passage 34 in plate 31. Plate 32 is provided with a cavity which has the configuration illustrated in FIGURE 2. An inlet chamber 35 is formed in plate 32 adjacent inlet passage 34. An orifice 36 is formed at the outlet of chamber 35. The gas stream which is introduced through passage 34 flows through orifice 36 and then divides so that approximately one half of the flow enters each of diverging passages 37 and 38. A portion of the gas stream which enters passage 37 flows through an outlet passage 39, and the remainder flows through a return passage 40 which extends to a point immediately downstream of orifice 36. In a similar fashion, the gas which enters passage 38 flows in part through an outlet passage 41 and in part through a return passage 42. The gas recycled through passage 40 tends to divert the stream ejected from orifice 36 toward passage 38, whereas the gas flowing through passage 42 tends to divert the stream toward passage 37. The two recycle streams act in opposition to one another in such a manner that any oscillations of the main stream between passages 37 and 38 are established. The frequency of these oscillations is a function of the molecular weight of the gas stream introduced into the oscillator. An increase in molecular weight of the gas stream tends to decrease the frequency of the oscillations due to the greater inertia of the gas stream.

In one specific embodiment of this invention, the apparatus of FIGURE 2 was constructed in accordance with the dimensions (expressed in inches) and angles set forth in the following table:

| | | | |
|---|---|---|---|
| A | 0.20 | $R_2$ | 0.13 |
| B | 0.64 | $R_3$ | 0.65 |
| C | 0.63 | $R_4$ | 0.63 |
| D | 0.20 | X | 32° |
| E | 0.25 | Y | 59° |
| $R_1$ | 0.15 | Z | 30° |

Plate 32 was formed of a sheet of metal having a thickness of approximately 0.015 inch. The passages illustrated were etched from this plate, and the plate was bonded between two optically flat glass plates 30 and 31. When helium was introduced into passage 34 at a rate of approximately 30 cubic centimeters per minute, the oscillator established an output signal of approximately 30,000 cycles per second. The frequency of this decreased when gaseous constituents other than helium were added to the inlet gas. It should be evident that the frequency of oscillations established by any given oscillator in accordance with this invention will vary in accordance with the size of the oscillator and the rate of flow of gas therethrough. However, this basic frequency decreases as the molecular weight of the gas increases. The oscillator can be formed from various materials such as metal or glass. The passages can be formed by etching, photoetching, engraving or any similar method. Thin metal sheets can be employed and laminated to form passages of any desired thickness.

In a chromatographic analyzer, the beat frequency response can be calibrated initially by employing reference samples of known composition.

While the oscillator of this invention has been described in conjunction with the analysis of the effluent from a chromatographic column, it should be evident that it is by no means limited thereto. This oscillator can be employed to advantage to detect changes in composition of fluid streams from any source. Any change in density of fluid directed through the oscillator will change the frequency of oscillations established. The oscillator can readily be calibrated by the use of reference fluids of known composition. While the device must be calibrated in any given application, it provides a simple device for measuring fluid compositions. When employed to measure a single stream, the frequency of the detected vibrations can be measured directly or compared with the output signal from a reference oscillator of constant frequency. An important advantage of the oscillator of this invention is that no moving parts are employed in the oscillator itself.

While the invention has been described in conjunction with a presently preferred embodiment, it should be evident that it is not limited thereto.

What is claimed is:

1. Apparatus for use in analyzing fluids comprising means forming a fluid passage, means to direct a first stream of the fluid to be analyzed through said passage, means to divert the first stream at the outlet of said passage into second and third streams, means to return a portion of said second stream to said passage in a direction so as to tend to divert a greater portion of said first stream into said third stream, means to return a portion of said third stream to said passage in a direction so as to tend to divert a greater portion of said first stream into said second stream, thereby establishing oscillatory fluctuations of the second and third streams, a vibration detector positioned to be actuated by at least a portion of the fluid which forms one of said second and third streams, and means connected to said vibration detector to measure the frequency of vibrations received by said detector.

2. The method of detecting changes is composition of a fluid stream which comprises directing a stream of fluid to be analyzed through a first passage, removing fluid from the first passage through second and third outlet passages, diverting a portion of the fluid from the second passage and directing such diverted fluid into the first passage in a direction such as to impinge upon the fluid flowing through the first passage and tend to divert the fluid from the first passage into the third passage, diverting a portion of the fluid from the third passage and directing such diverted fluid into the first passage in a direction such as to impinge upon the fluid flowing through the first passage and tend to divert the fluid from the first passage into the second passage, and measuring the frequency of vibrations established by the resulting oscillatory fluid flow, whereby changes in the measured frequency are indicative of changes in composition of the fluid stream directed through said first passage.

3. The method of detecting changes in the composition of the effluent fluid from a chromatographic column which comprises directing such effluent fluid through a first passage, removing fluid from the first passage through second and third outlet passages, diverting a portion of the fluid from the second passage and directing such diverted fluid into the first passage in a direction such as to impinge upon the fluid flowing through the first passage and tend to divert the fluid from the first passage into the third passage, diverting a portion of the fluid from the third passage and directing such diverted fluid into the first passage in a direction such as to impinge upon the fluid flowing through the first passage and tend to divert the fluid from the first passage into the second passage, and measuring the frequency of vibrations established by the resulting oscillatory fluid flow, whereby changes in the measured frequency are indicative of changes in composition of the effluent from the chromatographic column.

4. In a chromatographic analysis system wherein a fluid sample to be analyzed is introduced into a chromatographic column, and a carrier gas is directed through the column to elute the constituents of the fluid sample; apparatus for detecting the eluted constituents comprising first and second detectors, each comprising means forming a fluid passage, means to divert fluid at the outlet of said passage into second and third streams, means to return a portion of said second stream to said passage in a direction so as to tend to divert a greater portion of the fluid in said passage into said third stream, and means to return a portion of said third stream to said passage in a direction so as to tend to divert a greater portion of the fluid in said passage into said second stream; means to direct the effluent from the column through the fluid passage of said first detector; means to direct a stream of reference carrier gas through the fluid passage of said second detector; a first vibration sensing means positioned adjacent said first detector; a second vibration sensing means positioned adjacent second detector; and means connected to said first and second sensing means to measure the difference between the frequencies of the vibrations received by said first and second sensing means.

5. In a chromatographic analysis system wherein a fluid sample to be analyzed is introduced into a chromatographic column, and a carrier gas is directed through the column to elute the constituents of the fluid sample; apparatus for detecting the eluted constituents comprising means forming a fluid passage, means to direct the effluent from the column through said passage as a first stream, means to divert the first stream at the outlet of said passage into second and third streams, means to return a portion of said second stream to said passage in a direction so as to tend to divert a greater portion of said first stream into said third stream, means to return a portion of said third stream to said passage in a direction so as to tend to divert a greater portion of said first stream into said second stream, a vibration detector positioned to be actuated by one of said first and second streams, and means connected to said vibration detector to measure the frequency vibrations received by said detector.

References Cited by the Examiner
UNITED STATES PATENTS 3,144,762  8/1964  Testerman et al. _____ 73—23.1
3,158,166  11/1964  Warren.

RICHARD C. QUEISSER, *Primary Examiner.*